Jan. 13, 1931.  G. P. BERRY  1,788,854

FLUID BRAKE CONTROL

Filed Feb. 27, 1928

Inventor
George P. Berry

By Blackmore, Spencer & Flint
Attorneys

Patented Jan. 13, 1931

1,788,854

UNITED STATES PATENT OFFICE

GEORGE F. BERRY, OF DETROIT, MICHIGAN, ASSIGNOR TO GENERAL MOTORS RESEARCH CORPORATION, OF DETROIT, MICHIGAN, A CORPORATION OF DELAWARE

FLUID BRAKE CONTROL

Application filed February 27, 1928. Serial No. 257,247.

This invention relates to a combined manual and power operated mechanism and more particularly to an improved operating means for vehicle brakes.

An object of the invention is to provide a simple construction whereby the pressure manually applied to a pedal or lever is supplemented by auxiliary power. As a more specific object, the arrangement is such that the applied effort is divided between a direct mechanical effort and a force exerted to put into operation the auxiliary brake applying means. The smaller of these forces is the force used to render available the auxiliary power. This smaller part is always a function of the applied effort. Other objects and advantages will be understood from a reading of the following description and an examination of the accompanying drawing.

The invention is illustrated as embodied in the brake applying mechanism wherein the manual effort is applied to a pedal, a part of the applied manual effort being effective directly on the brake system, and a fractional portion of the effort, having a definite relation thereto, being operative to cause to come into action an auxiliary source of power. In devices of this kind the suction of the motor is frequently used as the source of such additional power, the suction being controlled by a valve, and through the instrumentality of the valve being applied to one side of the piston operatively connected to the brake system, the other side of the piston being subject to atmospheric pressure. The improved operating mechanism of this application is applied to such a system and as the valve and cylinder of such vacuum brake systems are well known, and since the specific type of valve and cylinder are not a part of this invention, it is deemed sufficient to show only such parts diagrammatically. The parts are not, therefore, illustrated in full detail.

Figure 1:
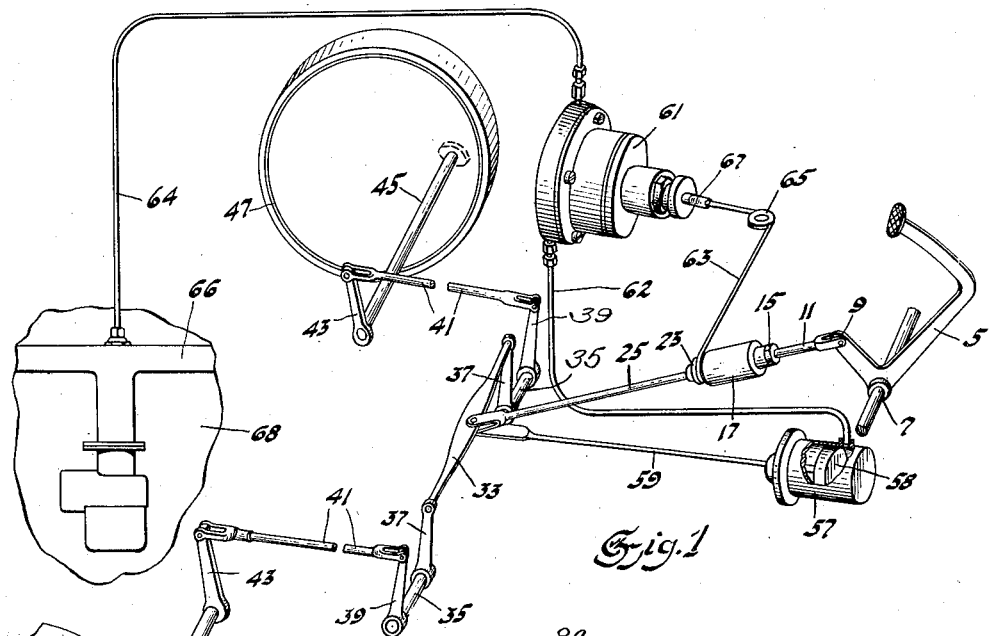
Figure 1 is a diagrammatic view showing the organization of parts including the novel operating means, the illustration showing how the inventive idea may be applied to a brake system for vehicles.

Referring by reference characters to the drawing, numeral 5 designates a brake pedal pivoted at 7 to any convenient part of the vehicle. Also pivoted to the pedal at 9 is a rod 11, the rod being connected by its threaded end 13 and a nut 15 to a housing 17. The housing 17 is formed with a relatively large bore opened to the other end. In its inner wall the housing is threaded as at 19 and rotatably engaging the threads is a screw member 21. Integral or rigid with the screw and located just outside the end of the housing is a pulley 23.

A rod 25 extends axially through a central opening in the pulley and screw and the screw and pulley are freely rotatable on said rod 25. The rod 25 has a head 27 located within the housing and between the head and the adjacent end of the screw are a plurality of anti-friction balls designated by numeral 29. Secured to the rod 25 just beyond the position occupied by the pulley is a fixed collar 31. By the construction described, it will be seen that the screw may be threaded back and forth in the housing. It is given such a rotation as the rod 25 moves outwardly with reference to the housing, the rotation being effected by the engagement of the screw 21 with the threaded portion 19 of the housing.

The pitch diameter of the screw and its threaded angle together with the tension of the rods 11 and 25 determine a torque on the pulley 23.

When the above arrangement is used for applying the brake, rod 25 may be connected to a member 33, the movement of which is to apply the brakes. Merely for the purpose of illustration, member 33 is shown as an equalizer intermediately connected to rod 25. At each side of equalizer 33 are a pair of rockshafts 35. These rockshafts are rotatably supported in any suitable manner not shown on the vehicle chassis. On the adjacent ends the rockshafts have lever arms 37. These arms are connected to the ends of equalizer 33. At their remote ends the rockshafts have arms 39. Links 41 connect lever arms 39 with lever arms 43 on other rockshafts 45, one such rockshaft located adjacent each wheel brake. The journal support of shafts 45 is not shown. Commonly, such shafts are journalled in the backing plate of the brake housing and also on a bracket on the axle. Such mounting may be adopted in this case if found convenient.

No invention is claimed for the brake per se. The drawing shows rockshafts 45 as extending into the brake enclosure 47. Suitable actuating means, such as a cam, may be mounted within the enclosure to apply the brake.

In the drawing, numeral 57 represents the cylinder of a vacuum brake. It is to be understood that, as usual, such a cylinder may contain a piston 58 connected by rod 59 to the member 33 and the movement of the piston will pull upon member 33 precisely as does rod 25. Such movement of rod 59 under the influence of piston 58 in the cylinder 57 will supplement the pull of the direct tension members 11 and 25 connected to the pedal. The cylinder on one side of the piston is in communication with the engine manifold through the intermediacy of a valve 61. Conduit 62 is shown connecting the cylinder 57 and the valve 61. The valve is connected by conduit 64 with the manifold 66 of an internal combustion engine 68. The valve may be and preferably is of a known type wherein when opened to afford communication between the manifold of the engine and cylinder 57, the opening is automatically closed after a predetermined movement of the parts of the valve and remains closed until again positively opened by further manual effort. The valve contains, as usual, a movable element and this element is actuated by the rotation of pulley 23. The movement of the pulley 23 may be connected in any preferred manner. I have shown as a comparatively simple mechanical connection a cable 63 trained over a pulley 65, the cable being attached at one end of the pulley. At the other end, the cable is engaged to a reciprocating part or rod 67 associated with the valve. The pull upon the cable and part 67 overcomes the tension of a coil spring 70, which coil spring then becomes effective to return the parts after brake application.

Figure 3:
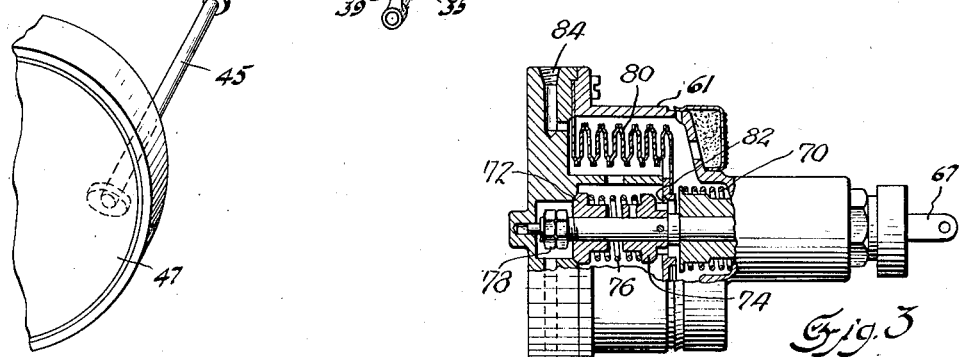
Figure 3 is a view of a detail in elevation partly in section.
Figure 2:
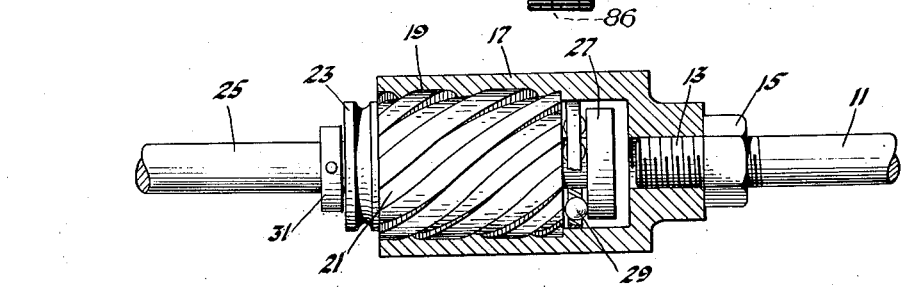
Figure 2 is a longitudinal section through a part of the brake hook-up.

No protection is herein being sought on the valve structure. Preferably, the valve 61 contains a suction valve member 72 slidable on rod 67 and an air valve member 74 fixed to said rod 67, there being a spring 76 between the valves and nuts 78 at the end of the rod. A bellows 80 carries a movable seat 82 for the air valve. The conduit 62 is to be connected to the valve at 84 and the conduit 64 is to be connected to the valve at 86. In operation a pull on rod 67 first closes the air valve against its seat and thereafter opens the suction valve. The unbalance between the reduced pressure within the bellows and the outer air causes the valve seat 82 to push rod 67 inwardly through its engagement with the valve 74 whereupon the spring 76 closes the suction valve. Upon complete release of pedal pressure, the spring 70 also opens the air valve, as shown in Figure 3.

In operation, as the pedal 5 is depressed the manual effort pulls directly through the tension member including rods 11 and 25. The pull is transmitted to part 33 and applies the brake. In doing so, a part of the manual effort, the proportion depending upon the pitch diameter of the screw and the angle of the threads, produces a rotation of the screw 21 and the pulley 23. Such rotation operates upon the valve 61 to introduce motor suction into the cylinder 57. The unbalanced pressure in cylinder 57 thereupon causes a pull through rod 59 and upon the equalizer 33 to supplement the mechanical pull through the tension member. The greater the tension on rods 11 and 25, the greater the torque upon the pulley. In operation, there is always a predetermined ratio between the force manually applied to the pedal and the force exerted upon the valve by the rotation of the pulley.

By this means, the pedal effort is greatly reduced, the major part of the work being done by the supplemental power. Furthermore, the applied effort in operating the control valve is always a function of the pressure applied to the pedal.

It will be understood that the valve 61 is reactionary by which is meant that suction is built up in the valve as it develops in the cylinder and causes a pull upon the flexible member 63 which tends to rotate pulley 23 in a clockwise direction as shown in Figure 1. This rotation operates as a force to pull upon rod 11 and react upon the pedal, the force exerted in this reaction being a measure of the suction built up in the valve and cylinder and, consequently, of the braking force extorted by the auxiliary power operating instrumentality.

I claim:

1. A combined manual and power operating device, a power control member associated therewith, said device comprising a tension member having parts arranged for relative axial movement, a plurality of threaded means, one rigid with one of said parts and the other rotatable on the other of said parts, mechanical means connected with said rotatable threaded means and said power control member to actuate the same.

2. A combined manual and power operating mechanism, a power controlling member associated therewith, said mechanism comprising a tension member having parts mounted for relative axial movement, and means, mounted on one of the parts of said tension member, for rotation about the longitudinal axis of said part, the other part of the tension member constructed to effect the rotation of said rotatable member, and mechanical means connecting said rotatable means and said power controlling member.

3. In a combined manual and power operating device, a power controlling member associated therewith, said device including a tension member having as a part thereof a member both reciprocable and rotatable, means connected to said last-named member whereby the device operates directly when the member is moved axially and other means mechanically connected with said member and said power controlling member operable to actuate the power operating device when said member is rotated.

4. In power brake operating mechanism, a manually operable lever, a brake member, a tension element therebetween, said tension element having parts in threaded engagement, a fluid pressure operated device, a mechanical connection between said device and said brake member, a valve to control said fluid pressure operated device, means connecting said valve and one of said threaded parts whereby said valve is controlled by movement of said parts.

5. In combination, a power controlling device, a two-part tension member, an operating lever connected to one of said parts, a movable operated member connected to the other of said parts, a screw rotatable on one of said parts about the longitudinal axis of said part, a co-operating threaded member rigid with the other part whereby relative axial movement is accompanied by rotation of the screw, means mechanically connecting said controlling device to said screw.

In testimony whereof I affix my signature.

GEORGE P. BERRY.